May 18, 1971   P. R. VOYENTZIE ETAL   3,579,387
SEALED AQUEOUS ALKALINE ELECTROLYTE CELLS WITH CREEP BARRIERS
Filed Aug. 12, 1968

INVENTORS:
PETER R. VOYENTZIE,
ROBERT J. LEHNEN,
BY Nathan Lompf
THEIR ATTORNEY.

United States Patent Office

3,579,387
Patented May 18, 1971

3,579,387
SEALED AQUEOUS ALKALINE ELECTROLYTE
CELLS WITH CREEP BARRIERS
Peter R. Voyentzie and Robert J. Lehnen, Gainesville,
Fla., assignors to General Electric Company
Filed Aug. 12, 1968, Ser. No. 751,968
Int. Cl. H01m 1/02
U.S. Cl. 136—163
2 Claims

ABSTRACT OF THE DISCLOSURE

A sealed cell having an aqueous alkaline electrolyte may be protected from leakage by interposing a creep barrier within the creep path of the electrolyte. Alpha,alpha-dihydroperfluoroacrylate polymers have been found to be superior creep barriers when used as an adherent layer intersecting the creep path. The creep barrier may be interposed between an O-ring seal and its seat in a vented cell construction.

---

Our invention relates to a novel cell having an improved ability to retain an aqueous alkaline electrolyte.

A persistent problem associated with the use of sealed cells utiliznig aqueous alkaline electrolytes, typically potassium hydroxide, is the tendency of the cells to allow some of the corrosive electrolyte to escape. The propensity of sealed alkaline aqueous electrolyte cells to leak is frequently characterized as "electrolyte creep," since electrolyte appears to slowly migrate from the interior of cell casings to the exterior through imperfect seals—which in many instances are at least initially gas tight. Electrolyte creep is disadvantageous since it may result in corrosive attack of delicate and/or expensive apparatus associated with the cells, the corrosion may cause the cells to become lodged within their holders so that they become difficult to remove, corrosive electrolyte on the exterior of the cells render the cells at least annoying, if not hazardous, to users, and, of course, electrolyte lost from cells is unavailable to perform its intended function. Despite considerable investigation of diverse sealed cell constructions, electrolyte leakage through creep is a continuing problem—particularly in sealed cell constructions where provision must be made for the venting of internal gases.

It is an object of our invention to provide a sealed cell construction in which electrolyte creep is significantly retarded, if not eliminated completely.

This and other objects of our invention are accomplished in one aspect by providing a sealed cell comprised of positive and negative plate means. An aqueous alkaline electrolyte provides ionic conductivity between the plate means. Housing means enclose the plate means and the electrolyte and define a creep path for electrolyte to the exterior of the housing. A creep barrier is adhered to the housing and traverses the creep path to retard creep of the aqueous alkaline electrolyte from the housing. The creep barrier is in one form preferably comprised of alpha,alpha-dihydroperfluoroalkyl acrylate polymer.

Figure 1:
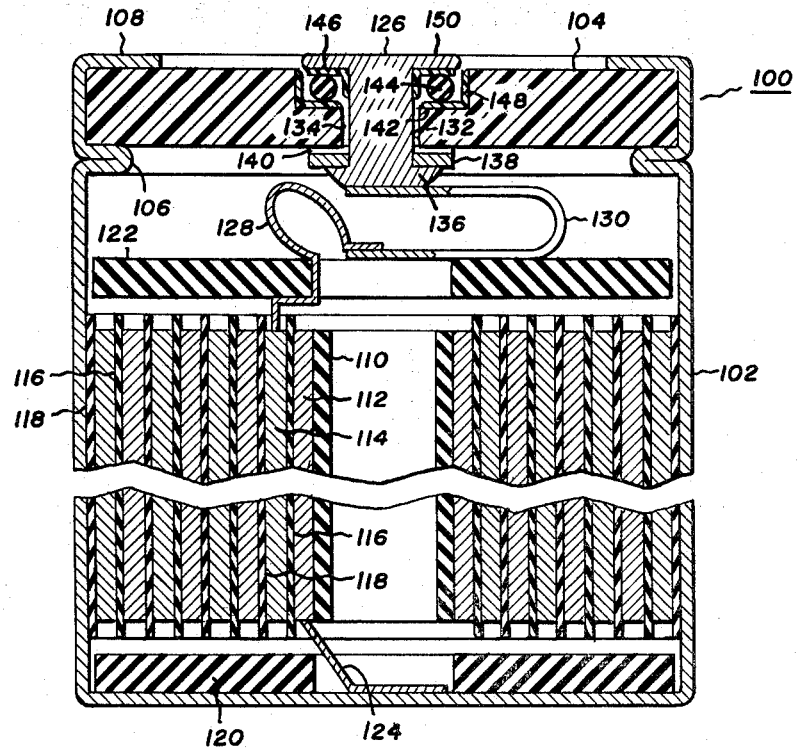
Figure 2:
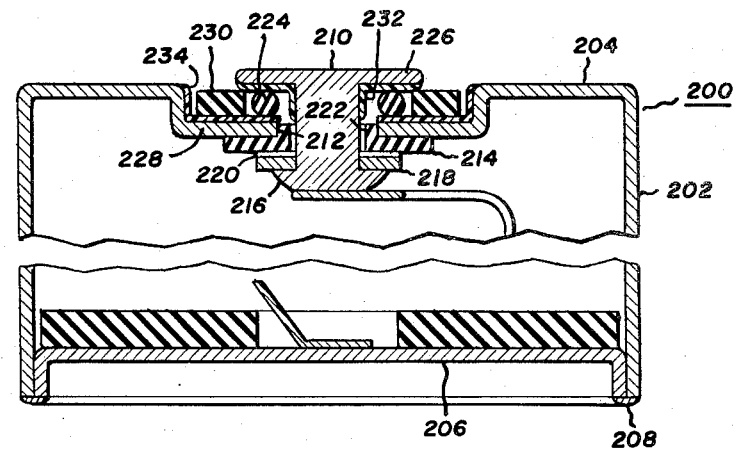

Our invention may be better understood by reference to the following detailed description considered in conjunction with the drawings, in which FIG. 1 is a vertical section, with parts broken away, of a cell constructed according to our invention, and FIG. 2 is a vertical section, with parts broken away, of an alternate housing construction and creep path barrier.

Noting first FIG. 1, a cell 100 is illustrated comprised of a casing 102 cooperating with an annular closure 104. The case is shown formed of an electrically conductive material while the closure is formed of an electrically insulative material. The case is provided with an annular crease 106 spaced from its upper end on which the cover rests. The upper terminus 108 of the case is crimped inwardly to positively hold the cover and case in engagement and to provide a seal therebetween.

Within the casing a mandrel 110 is positioned on which a negative plate 112 and a positive plate 114 are spirally wound electronically insulated by spacers 116 and 118. The spacers are porous and normally hold the electrolyte for the cell by capillary action. The spacer 118 surrounds the periphery of the spirally wound cells to insulate the plate from the casing. An annular insulative spacer 120 is positioned beneath the plates and a similar spacer 122 is positioned above the plates.

The negative plate is electrically connected to the cell casing through a connector tab 124. The connector tab may be conveniently spot welded to the interior surface of the casing. The positive plate is electrically connected to positive terminal button 126 by means of connector tab 128 and resilient strip 130. The terminal button extends through an aperture 132 in the cover. Radially spaced around the periphery of the aperture are V-grooves 134. The lower portion of the terminal is flared at 136 to engage a washer 138. The washer may, if desired, be provided with a plurality of V-grooves 140. The cover is provided with a recess shoulder 142 surrounding the aperture. Annular O-ring seal 144 is compressed between the shoulder and a head portion 150 of the terminal button. Creep barriers 146 and 148 are adhered to the terminal button and the cover shoulder, respectively, so as to cooperate with the O-ring seal.

From the foregoing description it is apparent that the casing, cover, and terminal button cooperate to form a housing for the cell within which the plates are sealed. A creep path is formed by the interior surface of the casing above the plates, the lower surface of the cover, the V-grooves 140 and 134, the under surface of the terminal button head 150, and the recessed shoulder 142 of the cover.

In use of the cell 100, the casing 102 serves as the negative terminal while the terminal button 126 serves as the positive terminal. The negative plate 112 delivers electrons to the negative terminal on discharge while the positive plate 114 receives electrons from the positive terminal. The aqueous alkaline electrolyte, not shown, within the separators 116 and 118 provide ionic conductivity between the plates. The separators prevent electronic shorting between the plates while the separator 118, and annular spacers 120 and 122 prevent the positive plate from contacting the casing.

Normally the O-ring seal 144 maintains the cell housing hermetically sealed. Should gas pressure develop beyond a predetermined level within the cell housing, as by heating of the cell or overcharging or overdischarging the plates, gas will pass through the V-grooves 140 and 134 and expand the O-ring seal to vent the gas and thereby relieve the excess pressurization.

During use a portion of the aqueous alkaline electrolyte will migrate from the separators along the interior surface of the casing. The casing being formed of a metal, usually steel, is particularly attractive to the electrolyte, since it exhibits a high surface energy causing the electrolyte to easily wet the surface and spread. It is noted that the washer 138 and terminal button are also formed of metal. Accordingly, once the electrolyte migrates across the undersurface of the cover, it will creep within the V-groove 140 and along the terminal button surface. While the O-ring seal is firmly compressed between the head portion 150 of the terminal button and the recessed shoulder 142 of the cover in hermetically sealed relation, the aqueous alkaline electrolyte may, nevertheless creep between the O-ring and one or both of these surfaces to escape from the cell.

It is our discovery that if a creep barrier, such as adhered layers 146 and 148, are interposed within the creep path in aqueous alkaline electrolyte may be retarded and retained by the barrier. The creep barrier differs from the materials used in construction of the cell housing in that it exhibits a very low surface energy and hence cannot be wetted by the aqueous alkaline electrolyte. Accordingly, the electrolyte will migrate up to, but not cross, the aqueous alkaline electrolyte.

While any low surface energy material may be utilized with some degree of improvement in lowering surface energy, we prefer to utilize polymeric fluorocarbons which produce a film having an extremely low surface energy. Exemplary materials of this general type include polytetrafluoroethylene, polyhexafluoropropylene, polychlorotrifluoroethylene, polyvinylidene fluoride, etc. as well as copolymers and interpolymers of these materials. Quite unexpectedly we have discovered alpha, alpha-dihydroperfluoroalkyl acrylate polymers to be superior as creep barriers. These polymers, commercially available under the trademark "Nyebar C," have been previously known to prevent hydrocarbon migration, but have never, prior to our invention been utilized to prevent the creep of aqueous alkaline electrolytes or like fluids. The polymers may be adhered to any desired surface within the creep path to serve as creep barriers. While any conventional technique for application may be utilized, a preferred technique is to apply the polymer to a surface of the creep path in a solvent. A suitable solvent for alpha, alpha-dihydroperfluoroalkyl acrylate polymers is xylene hexafluoride. The solvent will evaporate leaving the polymeric material as an adhered creep barrier. The resulting barrier possesses the surprisingly low surface energy of 11 dynes/cm. This is not to imply that surface energy alone can predict effectiveness of creep barrier materials. For example, another halocarbon polymer possessing a surface energy of only 14 dynes/cm. was found to be ineffective to prevent creep of potassium hydroxide where alpha, alpha-dihydroperfluoroalkyl acrylate polymers were successful.

Having available a highly effective creep barrier allows consideration of novel sealed cell configurations which heretofore would not have been considered feasible because of the propensity of aqueous alkaline electrolytes to creep along metal surfaces. Noting FIG. 2, for example, a cell 200 is illustrated in section with the upper washer, plates, and mandrel being omitted since these are identical in construction and assembly to those of the cell 100. The distinguishing feature of the cell 200 is the casing 202, which is provided with an integral metal wall 204 at its upper end to replace the cover of the cell 100. An end wall 206 is welded to the lower end of the casing 208. A terminal button 210 extends through a central aperture 212 in the integral upper wall. An insulative bushing 214 insulates the terminal button from the upper wall. The terminal button is flared at its lower end as indicated at 216 to engage a washer 218. The washer may, if desired, be provided with V-grooves 220 while the gasket is provided with V-grooves 222. An O-ring 224 is compressed between a head portion 226 of the terminal button and a depressed annular shoulder 228 of the upper wall. An annular insulative spacer 230 is annularly spaced from the O-ring and is held in position by the head portion of the terminal button. Creep barriers 232 and 234 are adhered to the lower surface of the head portion of terminal button and the upper surface of the annular shoulder of the upper wall portion, respectively.

From an inspection of the cell 200 it is apparent that it is operatively identical to the cell 100 insofar as normal use is concerned. The cell 200 offers the manufacturing advantage in that the necessity of creasing and crimping to achieve a reliable seal to an insulative cover is eliminated. This makes the cell construction considerably more adaptable, since lighter metal gauges may be utilized and special crimping and creasing machinery need not be available for the specific size of cell sought to be manufactured, since the weld 208 can be placed on a cell casing any size.

What would have heretofore appeared to be a disadvantage—namely, the integral upper wall formed of metal—is no longer a disadvantage in view of our invention. Because the uper wall is metal, a high surface energy material, an aqueous alkaline electrolyte will readily creep along this surface. The provision of the creep barriers 232 and 234, however, avoids leakage of electrolyte that would otherwise readily occur.

While our invention has been discussed with specific reference to preferred cell constructions, it is readily apparent that our invention may be applied to modified cell constructions. For example, while the creep barriers have been shown to be associated with the O-ring seals of the cells, it is apparent that the creep barriers will be effective if coated anywhere along the creep path for the aqueous alkaline electrolyte. The creep barriers may take the form of thin adherent films within the V-grooves, one or more coatings on the interior of the casing above the plates, etc. It is further recognized that an O-ring does not represent the only potential creep path for electrolyte out of an otherwise sealed cell. For example, the seal between the cover 104 and casing 102 represents a potential creep path and a creep barrier according to our invention may be associated therewith. The composition of the positive and negative plates is, of course, immaterial to the practice of our invention. We have found our invention to be useful in conjunction with nickel-cadmium and nickel-zinc cells, but other conventional cells having aqueous alkaline electrolyte would not be benefitted by our invention. It is also recognized that our invention is readily applicable to cell constructions in which flat, rather than spiral wound, plates are employed.

It is considered that various alternate arrangements will readily occur to those skilled in the art having knowledge of our invention. It is accordingly requested that the scope of our invention be determined by reference to the following claims.

What we claim and desire to secure by Letters Patent of the United States is:

1. A sealed cell comprised of
positive and negative plate means,
an aqueous alkaline electrolyte providing ionic conductivity between said plate means,
housing means enclosing said plate means and said electrotyte, said housing means defining a creep path for said electrolyte from the interior to the exterior of said housing means and including means for venting excess pressure from said housing means comprised of an O-ring seal and cooperating means seating surfaces for said O-ring seal, and a creep barrier interposed between said O-ring seal and each of said seating surfaces of said cooperating means to retard creep of said aqueous alkaline electrolyte from said housing means, said creep barrier comprising a material having a low surface energy and being non-wettable by said aqueous alkaline electrolyte.

2. A sealed cell according to claim 1 in which at least one of said seating surfaces of said cooperating means is formed of a material exhibiting a high surface energy, said creep barrier material having a surface energy substantially lower than any of said seating surfaces.

References Cited

UNITED STATES PATENTS

| 1,050,893 | 1/1913 | Willard | 136—163 |
| 3,293,081 | 12/1966 | Daley | 136/179 |
| 3,320,097 | 5/1967 | Sugalski | 136—178 |
| 3,415,690 | 12/1968 | Richman | 136—178 |

DONALD L. WALTON, Primary Examiner

U.S. Cl. X.R.

136—178